June 16, 1964  J. D. TOFT  3,137,581
PROCESS FOR COOKING AND CANNING SARDINES
Filed Dec. 20, 1960  6 Sheets-Sheet 1
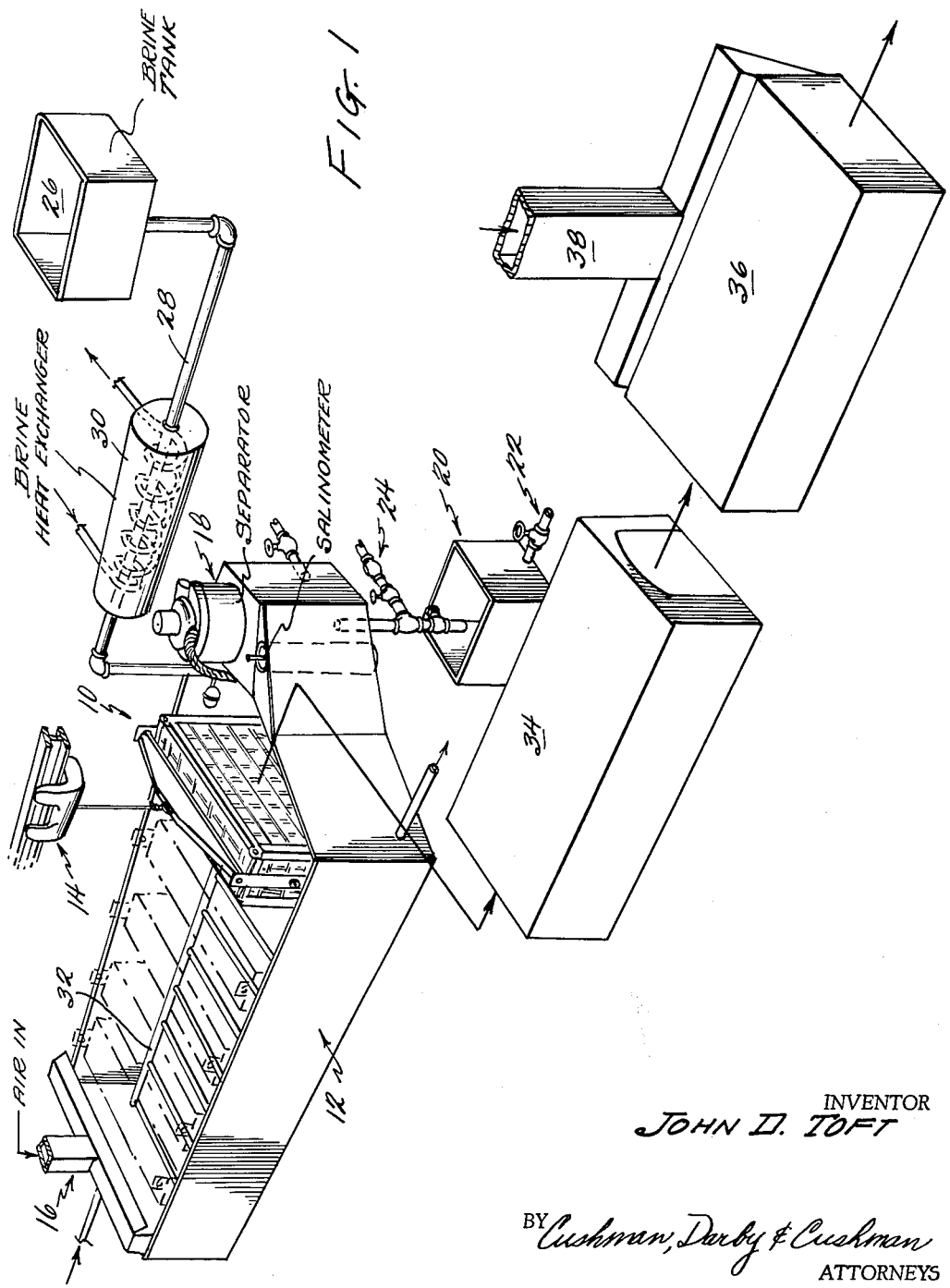
INVENTOR
JOHN D. TOFT
BY Cushman, Darby & Cushman
ATTORNEYS

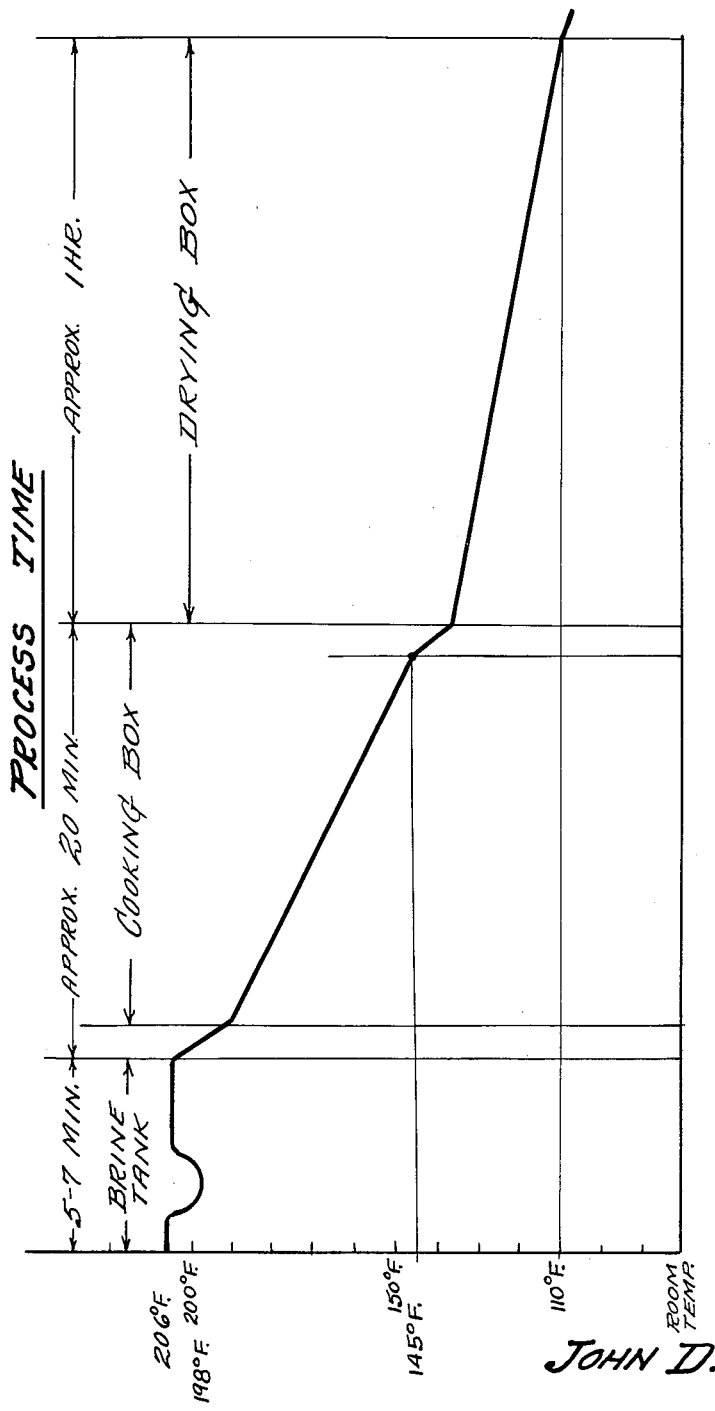

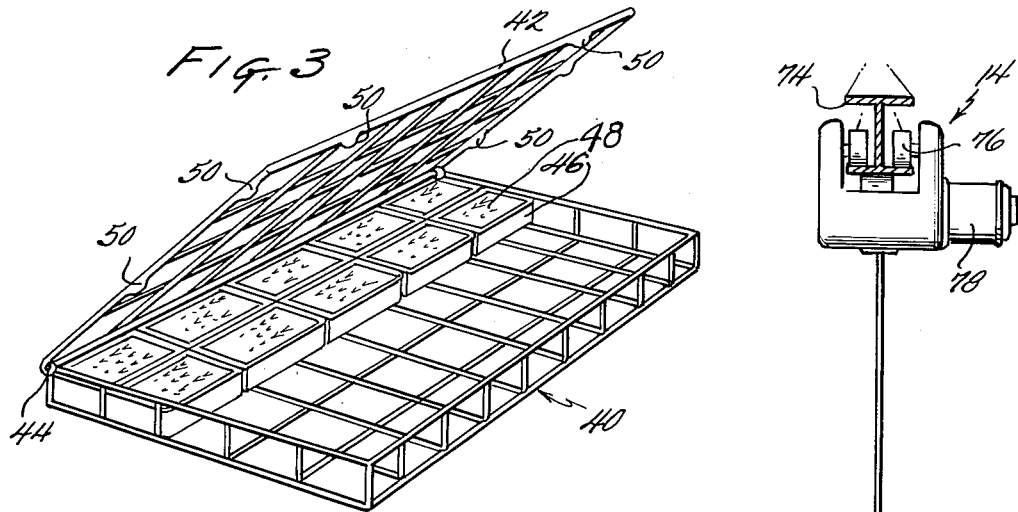

June 16, 1964   J. D. TOFT   3,137,581
PROCESS FOR COOKING AND CANNING SARDINES
Filed Dec. 20, 1960   6 Sheets-Sheet 4
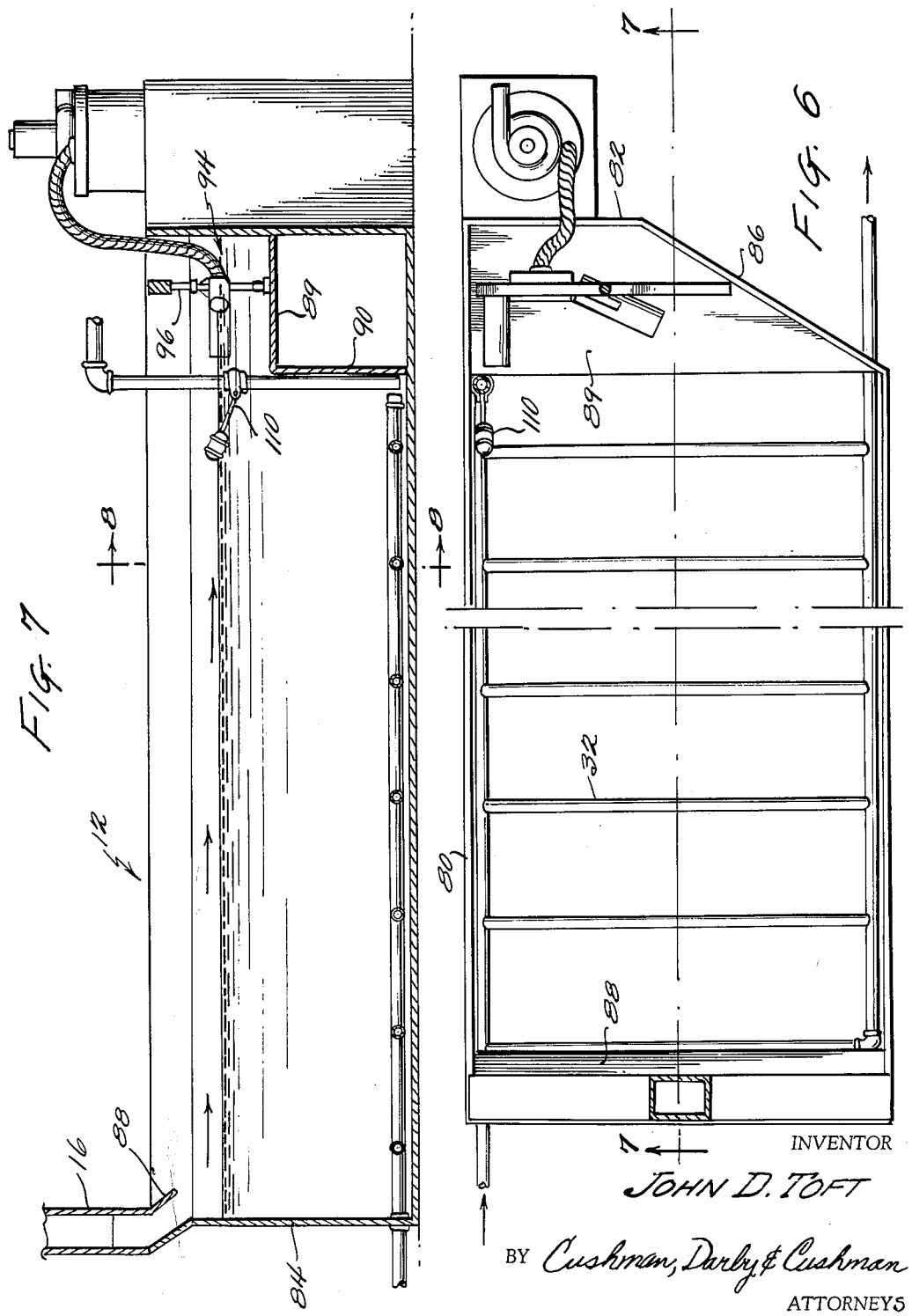

June 16, 1964　　　　J. D. TOFT　　　　3,137,581
PROCESS FOR COOKING AND CANNING SARDINES
Filed Dec. 20, 1960　　　　　　　　　　　6 Sheets-Sheet 5

INVENTOR
JOHN D TOFT
BY Cushman, Darby & Cushman
ATTORNEYS

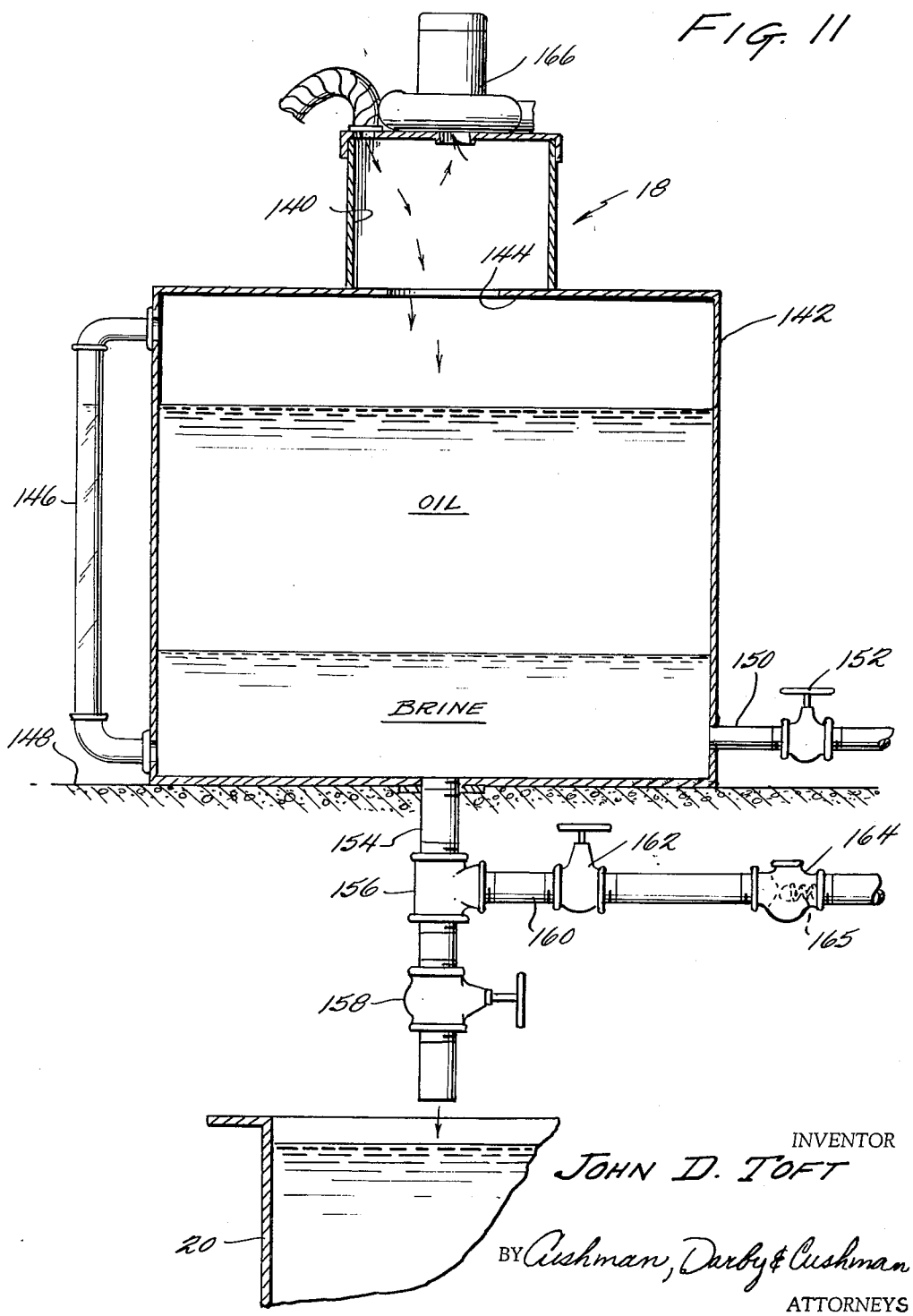

United States Patent Office 3,137,581
Patented June 16, 1964

3,137,581
PROCESS FOR COOKING AND CANNING
SARDINES
John D. Toft, Browns Wharf, Portland, Maine
Filed Dec. 20, 1960, Ser. No. 77,207
12 Claims. (Cl. 99—188)

This invention relates to a new and improved method and apparatus for cooking sardines, and the like.

In the prior art commercial preparation of sardines for consumption, the following general method is utilized:

The sardines, after having been salted and dressed, are packed by hand in open cans. The cans are placed in baskets or racks and then moved to a steam chamber where the sardines are cooked by the steam while in the cans. After having been cooked in the steam chamber, the baskets of cans are then removed from the chamber, and the baskets are tilted to drain the condensed steam, brine, and fish oil from the can. After draining the sardines in this fashion, the cans, while still in their baskets, are passed through a drying chamber through which air is blown to properly reduce the moisture content of the cooked sardines. The cans are then subsequently closed and sealed by conventional canning procedures.

Cooking by this method has a number of disadvantages. First of all, the undesirable natural oil of the sardines is cooked, but nevertheless remains in the cans and subsequently is retained on the fish. This oil not only imparts a brown color to the sardines, but also impairs their flavor. The steam also tends to dilute the brine in the can by condensation.

According to this invention, the shortcomings of the prior art cooking of sardines are obviated.

Briefly, the method of cooking sardines according to this invention, together with important advantages thereof, are as follows:

The sardines are salted and dressed and placed in individual cans ultimately to be sealed after the preparation of the sardines is completed. The open-top cans of sardines are then placed in trays, which in turn, are mounted one upon another in a suitable rack. The racks of sardines are then cooked in a brine tank.

Sardines contain a considerable amount of oil or fat, located between the skin and the flesh. The hot brine separates the oil from the sardines, the oil rising to the surface of the brine where it forms a layer of oil film on the top of the brine.

By separating the oil from the sardines during this brine cooking process, and by maintaining the fish out of further contact with the oil due to the immersion of the racks within the brine, an enhanced product is obtained, as will be evidenced.

The film of oil at the surface of the brine is then skimmed off and the oil is separated from any brine collected therewith for subsequent use, as desired.

It is important that the sardines, after being cooked, have the right salt content. Too much salt, of course, will render them too salty in flavor, while too little will render them insufficiently salty to taste. In actual practice the cooking brine must be maintained within a very narrow range. Consequently, the salinity must be checked periodically, and, if incorrect, brought back to the proper reading either by dilution with hot water or by dumping in additional salt.

After the sardines have been cooked in the brine, they are removed, while in the racks, to a closed, insulated cooking chamber. Because of the heat already retained in the sardines, cans, and the like, the sardines continue to cook while in the cooking chamber. Due to this arrangement, it will be seen that a considerable quantity of fuel is saved by conserving the cooking heat within the sardines and the cans.

After passing through this stage, the brine remaining in the cans is drained off. The racks are then passed through a drying chamber where the sardines are cooled still further; and, after passing through the drying chamber, the cans of sardines are ready for ultimate sealing, and may be run through a conventional closing and sealing machine.

It is accordingly an object of this invention to provide a new and improved method of cooking sardines and the like in a brine tank wherein the oil from the sardines rises to the top of the brine and may be skimmed off.

An object of this invention is to provide a method of cooking sardines and the like wherein the sardines are submerged and cooked in brine, wherein a new and improved product is obtained; the sardines being cooked according to this invention have a white appearance, and a lower quantity of entrained oil than sardines produced by heretofore known methods.

Another object of this invention is to provide a new and improved cooking tank for the sardines. The tank according to this invention includes: means for blowing a curtain of air along the level of the brine therein; means for regulating the level of the brine solution within the tank; and means for removing the oil film from the tank.

Another object of this invention is to provide a new and improved separator wherein the fish oil and some of the brine which has been removed from the tank are separated by pressure responsive means.

Still another object of this invention is to provide a new and improved apparatus for rapidly cooling a sample of brine solution in order to obtain a salinometer reading therefrom. In this regard, it is known that salinometer readings obtained from brine solutions which are at elevated temperatures are relatively inaccurate, and it is important that the brine be at a relatively cool temperature in order to effect an accurate reading therefrom.

Yet another object of this invention is to provide new and improved tray rack, and cart means for effectively moving the sardines through the various cooking and preparation stations thereof.

Still further objects and advantages of this invention will become apparent in the specification, claims, and accompanying drawings, wherein:

FIGURE 1 is a diagrammatic perspective view of various features of the method and apparatus according to this invention, and additionally provides the flow diagram for the method of preparing sardines according to this invention;

FIGURE 2 is a temperature-time graph illustrating the preferred sequence of operation according to the present invention;

FIGURE 3 is a perspective view of a tray for holding the individual open cans of sardines according to this invention;

FIGURE 4 is a perspective view of a rack and cart assembly for moving the open cans of sardines through the various stages of this invention;

FIGURE 5 is a perspective view of the cart shown connected to conveyor means for moving the cart to and from various stations which are provided for operating on the sardines;

FIGURE 6 is a plan view of the sardine cooking tank according to this invention;

FIGURE 7 is a view taken substantially along line 7—7 of FIGURE 6;

FIGURE 11 is an elevation section view of the separator according to this invention.

*Method*

Figure 8:
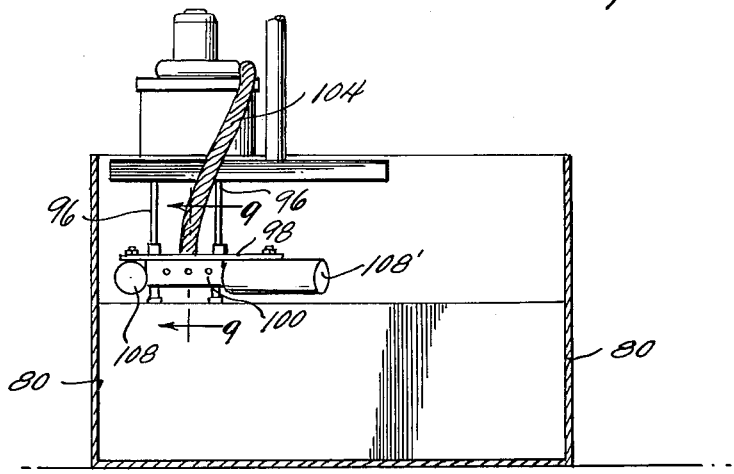
FIGURE 8 is a view taken along line 8—8 of FIGURE 7.

Reference is now made to the drawings and particularly to FIGURE 1 to set forth a detailed description of the method of cooking sardines according to this invention.

As previously mentioned, the sardines are prepared for treatment by removing the heads, salting the fish, and placing the sardines in individual cans, which open-top cans will ultimately be sealed and otherwise used for marketing. After the cans have been so filled, they are placed in wire trays, the cans at this time not having tops. The sardines within the cans are thus visible along the upper surface of each of the trays. A number of trays are mounted one above the other in a rack, sufficient space being provided between each of the trays to permit the brine to come in contact therewith, as will be apparent.

The racks, indicated generally at 10, are moved into the brine tank 12 by suitable conveyor means 14. In this regard, the racks 10 of sardines are preferably immersed wholly below the level of the brine, for reasons to be apparent hereinafter.

The temperature of the brine is preferably about 206° F., although the temperature may drop momentarily when the relatively cool racks in the brine are immersed to about 198–200° F.

The racks 10 of sardines are cooled in the brine tank 12 for about 5–7 minutes, depending on the size of the individual sardines. During this cooking stage, the brine separates the oil from the sardines, the oil rising to the surface of the brine.

While the racks 10 of sardines are cooking in the tank 12, a curtain of air is blown over the surface of the brine through manifold 16, moving the film of oil which has risen to the surface of the brine to the opposite end of the tank 12 to the region of a separator 18. The oil is removed from the surface of the brine by means to become apparent hereinafter and passes into the separator 18; and, the oil and any brine removed therewith are separated and the oil is dumped into a collecting tank 20. Suitable valve means 22 are disposed at the bottom of the collecting tank to drain the fish oil therefrom, and water take-off means are provided at 24. The specific features of the separator 18, valve means 22, water take-off means 24, and related elements, will become more fully apparent during the detail discussion thereof.

A make-up brine feed tank 26 is provided, which is connected to the cooking tank 12 by suitable piping 28. A brine heat exchanger 30 is provided to allow for the proper maintenance of brine make-up feed temperature, which is important to the proper cooking of the sardines. The brine within the tank 12 is maintained at its desired temperature by heating coil 32, connected to a water heating means (not shown).

After the racks of sardines have been properly cooked, they are removed from the cooking tank 12 by the conveyor means 14 and thence moved on a cart to a closed cooking chamber 34, which is preferably insulated. Because the racks, the trays, the cans and brine and sardines therein at the time of being removed from the cooking tank are at a temperature of about 200° F., the sardines continue to cook in the cans while in the cooking chamber 34. After about twenty minutes continued cooking in the chamber 34, and after the sardines have cooled down to about 145 to 150° F., the chamber is opened and the carts and racks are removed therefrom. The brine remaining in the individual cans is then drained off, as by tipping the enclosed rack. At this time, the racks and trays may be sprayed with cold water from a hose to both cool the sardines somewhat further, and also to wash any brine from the exterior of the can.

The racks are left in this position for about one hour while the carts are pulled through a drying chamber 36. The drying chamber 36 may be in the nature of a tunnel about 50 feet long through which air at a temperature of about 110° F. is blown at a rate of about 7,000 cubic feet per minute. After about an hour in the drying chamber 36, the racks are tilted back to their upright positions so that there will be no possibility of sardines stacking to the underside of the tray next above. The drying and cooking process is then continued for about another half hour in the drying chamber 36, and at the end of this stage, the sardines have been adequately dried and cooled to about 100° F. The cans are then ready for ultimate sealing, and may be run through a conventional closing and sealing machine.

Turning now to FIGURE 2, there is shown a graph representing the preferred cooking temperatures and times for the sardines according to this invention, which have provided optimum results.

The temperature of the brine in the brine tank 12 is quite important. As shown in FIGURE 2, the temperature in the brine is maintained at approximately 206° F. As the racks of sardine cans are placed within the brine tank 12, the temperature drops to a minimum temperature of about 198° F. and thence is raised to its preferred cooking temperature of approximately 206° F. It has been found to be important that the temperature of the sardines does not drop to below 198° F. in the cooking tank 12. The salinity range of the brine is preferably maintained between 20° and 25°. After the sardines have cooked for about five to seven minutes in the cooking tank 12, depending, of course, on the size of the sardines and the particular texture thereof, the sardines are removed to the cooking chamber 34. The racks of sardines are then disposed within the cooking chamber 34 for approximately twenty minutes, wherein the temperature drops to approximately 145° F.

After the fish have been moved from the cooking box, they are moved to the drying chamber 36. The temperature of the fish within the drying chamber drops to approximately 110° F. over a period of about one hour, at which time the fish may then be suitably sealed in their cans by conventional canning procedures, as previously mentioned.

*Rack and Tray Structure*

Referring to FIGURE 3, there is shown in perspective an individual cooling tray 40, which is preferably constructed of wire or the like, having a top 42 pivotable at one end thereof as at 44. Disposed within the tray 40 are a number of open-top sardine cans 46 within which the prepared sardines 48 are disposed. Preferably, the top 42 of the tray 40 has downwardly depending portions 50, so that when one tray is placed above the other, sufficient space is provided between adjacent upper and lower can surfaces to permit brine to flow therethrough.

In FIGURE 4 there is shown a plurality of stacked trays 40 disposed one above the other, and mounted on a rack 52. The rack 52 includes vertical retaining members 54, 54' and transverse members 56, defining a generally rectangular structure. Extending outwardly from central end members 54, 54' (not shown) are trunnions 58. Mounted at the top of the rack 52 and also at the end of each of the central vertical members 54' are means providing an aperture 60, which may be used in connection with the conveyor means 14 to move the rack 52 as desired.

Mounted across the upper transverse member 56 is a supporting member 62 having apertures 64 extending therethrough. In a like manner, the apertures may be used in connection with the conveyor means 14 for moving the rack 52 to its desired position. While, preferably, each rack 52 is disposed wholly below the level of the brine to provide an unobstructed path for the air curtain from the manifold 16, the member 56 may have perforations therethrough (not shown) to minimize the obstruction to the flow of air, if it should be desired not to wholly submerge the rack 52 in the brine.

There is provided a cart 66 having wheels 68 mounted thereon, the cart having upwardly extending end portions 70. The end portions 70 include a V-shaped bearing member 72 at each end thereof, on which the trunnions 58 of the rack 52 are received. As is apparent, there is provided by this arrangement a means for conveniently moving the open cans of sardines to various positions, and also for tilting the rack 52 to remove any brine solution that has accumulated therein, when desired.

As FIGURE 5 shows, the rack 52 is engaged on the conveyor means 14. The conveyor means 14 conveniently rides on an I beam 74 which is disposed above the cooking tank 12, as shown in FIGURE 1. The conveyor means 14 has driven wheels 76 coupled to a suitable electric motor 78 operatively connected thereto, as diagrammatically shown in FIGURE 5. The conveyor means per se, however, forms no part of the present invention.

*General Tank Structure*

Reference is now made to FIGURES 6, 7 and 8, which show the detailed construction of the cooking tank 12 according to the present invention. The cooking tank 12 includes vertical side walls 80, and forward and rear end walls 82 and 84 respectively. The forward end wall 82 merges with a vertical side wall 80 by an angularly extending plate 86. The heating coil 32 for the tank 12 is shown in FIGURES 6 and 7.

The manifold 16, mounted adjacent the rear end wall 84, is connected to a suitable source of air-pressure (not shown) and includes a downwardly extending transversely disposed baffle 88 which provides for directing a curtain of air over the surface of the brine within the cooking tank 12.

Reference is now made to the region of the cooking tank 12 in the area adjacent the forward end wall 82 and the angle plate 86, opposite the manifold 16 and the rear end wall 84. As shown in FIGURE 7, there is disposed a platform 89 which extends transversely across the forward end of the cooking tank 12, the platform 89 being supported by a vertical plate 90. As is apparent, the brine solution disposed above the platform is relatively calm compared to the brine solution in the rest of the tank in the region where the heating coil 32 is disposed. The curtain of air from the manifold 16 thereby blows the oil which has risen to the surface of the brine tank 12 to the forward end of the cooking tank 12, the relative calm region defined generaly by the platform 88.

Figure 9:
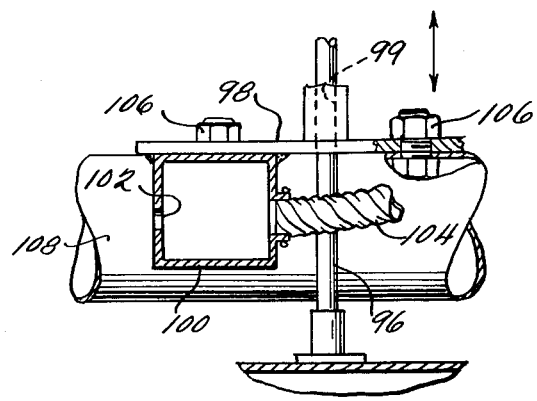
FIGURE 9 is a view taken along line 9—9 of FIGURE 8.

There is shown generally at 94 a suction manifold means for removing the film oil from the surface of the brine solution. The suction manifold means 94 is vertically slidable on spaced-apart vertical rods 96, as best shown in FIGURES 8 and 9. The suction manifold 94 includes a horizontal plate 98, below which is mounted a manifold member 100. As best shown in FIGURE 9, the horizontal plate 98 includes apertures 99 through which the rods 96 slidably pass. The manifold member 100 includes spaced apart horizontally disposed apertures 102, best shown in FIGURE 9. Also connected to the manifold member 100 is a flexible tube 104. Secured to the horizontal plate 98, as by a plurality of bolts 106, are two small enclosed tank members 108, 108′, preferably made of a light material as sheet metal. The tank members 108, 108′ are preferably disposed angularly relative to one another, the tanks 108, 108′ providing a buoyant force for the suction manifold means 94. The buoyancy of the tank members 108, 108′ is such that the apertures 102 of the manifold member 100 are disposed at the level of the oil film on the surface of the brine solution in the tank 12. As is apparent, if the level of the brine solution is raised or lowered, the suction manifold means 94, which is mounted on the plate 98, will ride upwardly and downwardly on the vertical rods 96, the apertures 102 always being at the surface level of the brine.

As will be more apparent hereinafter, a vacuum is imparted to the flexible tube 104 so that the oil film and, incidentally some of the brine, will be drawn through the apertures 102 into the flexible tube 104. This arrangement provides for removal of the oil film regardless of variations in the level of the brine solution within the tank 12.

When the racks 52 are lifted out of the cooking tank 12, the open sardine cans will remove a quantity of brine from the tank 12. In order to maintain a proper brine level, the latter is equipped with an automatic level maintaining system including a conventional float valve 110 which is operatively connected to a replenishing pump. In turn, the valve 110 is connected to the brine make-up feed line 28, as shown in FIGURES 1, 6, and 8.

Suitable overflow collecting means (not shown) may also be mounted above the normal level of the brine within the tank 12, to avoid inadvertent spilling over of the brine from the top of the tank 12. In a like manner, drain means (not shown) may be provided to empty the tank 12, as for cleaning purposes.

As previously noted, a heat exchanger 30 is disposed between the brine feed tank 26 and the cooking tank 12 wherethrough the brine make-up feed passes through the piping 28 and through the heat exchanger 30 wherein the temperature is maintained at approximately 200° F. The supply of steam to the heat exchanger may also be automatically controlled by aforementioned pump controlling float so as to supply steam to the heater while the pump is running. As will be apparent, equivalent heating means may be provided for the brine feed line 28.

As previously stated, the salinity content of the brine is important in order to obtain a proper cooking condition. The relatively hot brine within the tank does not lend itself to an accurate reading with conventional salinometers, and, therefore, means are provided to quickly reduce the temperature of a sample of the brine solution in order to effect an accurate salinometer reading.

Figure 10:
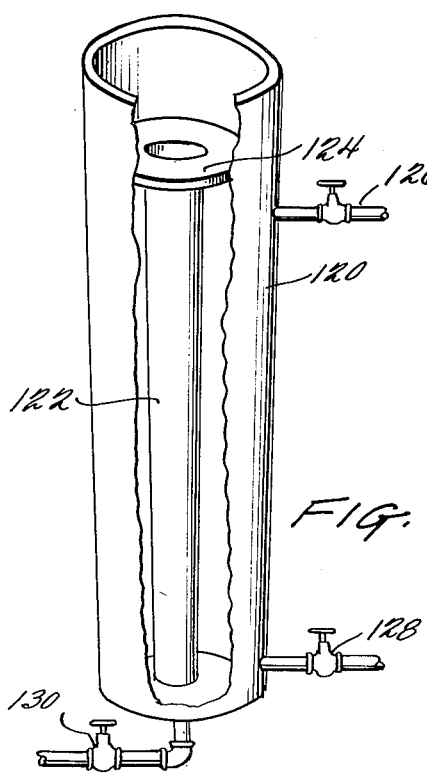
FIGURE 10 is a perspective view, partially broken out, showing the heat exchanger used for rapidly cooling a sample of brine solution for obtaining a salinometer reading thereof.

Referring to FIGURE 10, there is shown an apparatus for reducing the temperature of a brine sample in order to obtain an accurate reading. There is provided an elongated tubular member 120 with a pipe 122 disposed longitudinally therethrough. The pipe 122 terminates in a flange member 124 which is secured to the inside wall of the member 120 near the upper end thereof, providing a pan portion. Valve inlet means 126 and valve outlet means 128 are provided in communication with the cylindrical member 120 for passing cooling water therethrough. Suitable valve outlet means 130 are provided in communication with the lower end of the pipe 122 to provide removal of the brine solution as it passes downwardly through the pipe 122. This arrangement provides for a rapid and effective reduction of the temperature of the brine sample in order to effect an accurate salinometer reading thereof.

*Separator*

Reference is now made to FIGURE 11, which shows generally the separator 18 for effecting a separation of the oil from the brine which has been collected through the flexible tube 104. The separator 18 includes generally an upper chamber 140, in communication with a lower chamber 142, by means of apertured plate 144. The separator 18 is provided with a suitable sight glass 146 which provides a convenient view of the level of the oil (and the brine) within the lower chamber 142. The separator 18 may be conveniently disposed on the floor 148 of the room wherein the various equipment is mounted, and the collecting tank 20 (previously described in FIGURE 1) may be disposed in the floor next below, as will be understood.

Near the lower end of the lower chamber 142 of the separator 18 is disposed a drain pipe 150 having a conventional gate valve 152 disposed thereon, the gate valve being normally closed. Passing through the floor 148 and in communication with the lower chamber 142 is an exhaust pipe 154. The straight run of the exhaust pipe 154 is in communication with the tank 20, as shown in FIGURES 1 and 11. There is disposed on the exhaust line pipe 154 a T 156 and, therebelow, a gate valve 158. Connected to the branch of the T 156 is a brine take-off line 160 with a gate valve 162 thereon, and further downstream a spring-biased ball-check valve 164.

At the top of the upper enclosed chamber 140 is a centrifugal air pump 166, and a connection for the flexible tube 104. The flexible tube will draw fish oil and some amount of brine solution into the upper chamber 140 by virtue of the vacuum therein. This mixture of liquids will then pass into the larger lower chamber 142 where the contents will be primarily oil, but with some amount of brine solution therebelow. During normal operation, the drain valve 152 is normally closed and the valve 162 is normally open, while the gate valve 158 is normally closed. According to this invention, an improved means for taking off a separated food is provided by virtue of this arrangement. As the level of the brine, and the oil thereabove rises in the chamber, the check valve will be normally closed, and when the level of the liquid in the lower chamber 142 arises a sufficient amount, the pressure on the spring 165 in the check valve 164 is overcome, thereby causing a discharge of the brine solution through the brine take-off line 160. As will be apparent, various conventional pressure-responsive check valves may be here provided. When the level of the liquid within the lower chamber 142 drops, the pressure of the spring 165 is relieved and the check valve 164 will again close, allowing the level of the liquid within the lower chamber 142 to again rise, to a level where the pressure is sufficient to again overcome the force of spring 165, to again dump the contents of the brine solution. After a time, the lower chamber 142 will be almost completely filled with fish oil alone, by virtue of this arrangement. At this time, the gate valve 158 may be opened, thereby dumping the fish oil into the tank 12. By this arrangement, it will be apparent that there is provided means for continuously withdrawing the fish oil from the surface of the drying solution within the tank 12, and separating this fish oil from the amount of brine solution carried therewith, whereby the fish oil may be collected by separate means and disposed of as desired.

*Operation*

Although the description of the operation of the various features of the invention should be apparent from the previous discussion herein, a summary of the operation of the method and apparatus of this invention will be made, the various cycles through which the sardines are subjected being shown in FIGURE 2.

The sardines are packed in open cans, and mounted in a wire tray 40, as shown in FIGURE 3. The plurality of trays are mounted one upon the other within the rack 52, and the rack 52 is moved to a position adjacent the cooking tank 12, preferably by carts 66. The racks 52 of fish are then connected to the conveyor means 14 and placed within the brine cooking tank 12, which has brine therein at about 200° F. The racks 52 are preferably disposed below the level of the brine solution in order that a curtain of air may be blown across the cooking tank 12 from the rear end thereof to the forward end thereof through air manifold 16. The sardines are cooked in the brine, as depicted in FIGURE 2, during which time the oil within the sardines is separated therefrom, rising to the top of the brine and moving to the forward end 82 of the brine tank 12 where it is drawn off, as shown in FIGURE 7. The mixture of the fish oil and some brine passes through a suction means 94 and is discharged. Separation of the fish oil in the remaining brine solution is effected in the separator 18 (FIGURE 11), means being provided to dump the fish oil from the separator 18 to the collecting tank 20. Means are also provided for a take-off of the remaining brine solution within the separator 18, as provided in FIGURE 11. Suitable make-up feed means are provided for the level of the brine solution within the tank whereby the level of the brine solution may be maintained within very relatively narrow limits. In a like manner, a heating coil 32 is provided for heating the brine solution within the brine tank 12.

After the sardines have been cooked for a period of time, as indicated in FIGURE 2, the racks 52 are removed from the brine tank 12, and moved to a cooking chamber 34 whereby, due to the heat already in the sardines, the cooking thereof continues. The racks 52 of sardines are then tipped sideways to drain the remaining brine solution therein and the open cans of sardines are passed through a suitable drying chamber 36 which moves air preferably in the order of 110° F. therein, to effect a drying of the sardines within the open cans. After the fish have passed through the drying chamber, the fish are otherwise ready for the final canning stages wherein the tops are added to the individual sardine cans.

It will, therefore, be seen that there has been provided by this invention a method and apparatus for cooking sardines, in which the various objects hereinbefore set forth, together with many practical advantages, are successfully achieved.

Throughout the specification and claims, the word "sardines" is conveniently utilized in a generic sense to refer to oily fish, whether cut or uncut, which oil may be separated therefrom by the action of hot brine.

As various possible embodiments may be made of the mechanical features of this invention, all without departing from the scope thereof, it is to be understood that all matters herein set forth or shown in the accompanying drawings is to be interpreted in an illustrative, and not in a limiting sense.

I claim:

1. A method of cooking sardines comprising the steps of: placing dressed uncooked sardines in open-top cans; submerging the cans, with the sardines therein, in heated brine having a salinity of the order of from about 20° to about 25°; maintaining the brine at a temperature of the order of from about 198° F. to about 206° F.; cooking the sardines, while in their cans, in the brine for a period of from about five minutes to about seven minutes, whereby the oil in the sardine is separated therefrom and rises to the surface of the brine to form an oil film thereon; and removing the oil film from the surface of the brine above the submerged cans of sardines, so that when the cans of sardines are removed from the brine after cooking therein, the surface of the brine is substantially free of oil film in the region of removal and the cooked removed sardines will be substantially free of oil.

2. The method defined in claim 1 wherein the oil film is removed from the surface of the brine by directing a curtain of air under pressure across the surface of the brine above the submerged cans of sardines so that the oil film moves to a region remote from the submerged cans of sardines.

3. The method defined in claim 2 including the further step of skimming the oil film off the brine at the remote region.

4. The method defined in claim 3 in which the skimming operation also skims off a quantity of brine, and including the further step of separating the skimmed off oil from the skimmed off brine.

5. The method defined in claim 1 including the subsequent steps of removing the cans of cooked sardines from the brine, immediately confining the cans of cooked sardines in a closed cooking region, and maintaining the cans of sardines in said region for a period of about twenty minutes, whereby the cooking continues during said period of confinement due to the residual heat in the sardines.

6. The method defined in claim 5 wherein the temperature of the sardines is lowered to the order of 145° F. during the period of confinement.

7. The method defined in claim 5 including the subsequent step of drying the sardines.

8. The method defined in claim 7 wherein the sardines are dried by blowing air thereover.

9. A method of cooking sardines comprising the steps of: placing dressed uncooked sardines having oil therein in open-topped cans ultimately to be sealed and marketed; submerging the cans, with the sardines therein, in heated brine having a salinity of the order of from about 20° to about 25°; maintaining the brine at a temperature of the order of from about 198° F. to about 206° F.; cooking the sardines, while in their cans, in the brine for a period of from about five to about seven minutes, whereby the oil in the sardines separates therefrom and rises to the surface of the brine and forms an oil film thereon; moving the oil film, by blowing air thereover, to a location remote from the submerged cans of sardines; skimming the oil from the surface of the brine at said remote location; removing the cans of sardines from the brine; draining any brine and remaining oil from the cans while maintaining therein the sardines; drying the cans and the sardines therein; and sealing the cans of cooked sardines for marketing.

10. The method defined in claim 9 wherein some brine is skimmed, along with the oil, off the surface of the brine, and including the step of separating the skimmed off oil from the skimmed off brine.

11. The method of cooking sardines comprising the steps of: placing dressed uncooked sardines in open-topped cans; submerging the cans of sardines in heated brine having a salinity of the order of from about 20° to 25°; maintaining the brine at a temperature of the order of from about 198° F. to about 206° F.; cooking the sardines, while in their cans, in the heated brine for a period of from about five to about seven minutes, whereby the oil in the sardines is separated therefrom and rises to the surface of the brine to form an oil film thereon; and skimming the oil film off the surface of the brine, so that when the sardines are removed from the brine, after the cooking has been completed, the cooked sardines will be substantially free of oil after their removal from the brine.

12. The method defined in claim 11 wherein the skimming step removes a quantity of the brine along with the oil film and including the further step of separating the skimmed off oil from the skimmed off brine.

References Cited in the file of this patent
UNITED STATES PATENTS

| | | |
|---|---|---|
| 1,942,830 | Peebles et al. | Jan. 9, 1934 |
| 2,058,849 | Bergen | Oct. 27, 1936 |
| 2,064,872 | Ash et al. | Dec. 22, 1936 |
| 2,088,831 | Ash et al. | Aug. 3, 1937 |
| 2,131,902 | Peebles et al. | Oct. 4, 1938 |
| 2,712,438 | Brown | July 5, 1955 |
| 2,730,337 | Roswell | Jan. 10, 1956 |
| 2,741,978 | Cheftel et al. | Apr. 17, 1956 |